(12) United States Patent
Mitachi et al.

(10) Patent No.: US 7,968,667 B2
(45) Date of Patent: Jun. 28, 2011

(54) ADHESIVE COMPOSITIONS FOR OPTICAL FIBERS

(75) Inventors: Seiko Mitachi, Tokyo (JP); Atsushi Kikkawa, Kanagawa (JP); Kazushi Kimura, Kanagawa (JP)

(73) Assignees: The Yokohama Rubber Co., Ltd., Tokyo (JP); Seiko Mitachi, Tokyo (JP)

( * ) Notice: Subject to any disclaimer, the term of this patent is extended or adjusted under 35 U.S.C. 154(b) by 940 days.

(21) Appl. No.: 11/574,640

(22) PCT Filed: Aug. 22, 2005

(86) PCT No.: PCT/JP2005/015203
§ 371 (c)(1),
(2), (4) Date: Mar. 2, 2007

(87) PCT Pub. No.: WO2006/025225
PCT Pub. Date: Mar. 9, 2006

(65) Prior Publication Data
US 2008/0009562 A1    Jan. 10, 2008

(30) Foreign Application Priority Data

Sep. 2, 2004 (JP) ................. 2004-255395
Sep. 2, 2004 (JP) ................. 2004-255832

(51) Int. Cl.
*C08G 77/04* (2006.01)
(52) U.S. Cl. .................. 528/25; 523/176; 528/38
(58) Field of Classification Search .......... 528/25
See application file for complete search history.

(56) References Cited

U.S. PATENT DOCUMENTS

| | | | |
|---|---|---|---|
| 5,041,481 A * | 8/1991 | Sugimori et al. ............ | 524/188 |
| 5,942,073 A | 8/1999 | Mowrer et al. | |
| 6,712,525 B1 | 3/2004 | Kawase et al. | |
| 2005/0249446 A1 | 11/2005 | Kohinata et al. | |
| 2008/0319142 A1* | 12/2008 | Kikkawa et al. ............ | 525/474 |

FOREIGN PATENT DOCUMENTS

| | | |
|---|---|---|
| EP | 0 488 949 B1 | 7/1995 |
| EP | 1 312 659 A1 | 5/2003 |
| EP | 1524307 A1 | 4/2005 |
| JP | 52-45634 | 4/1977 |
| JP | 61-203185 A | 9/1986 |
| JP | 61-287977 A | 12/1986 |
| JP | 4-275383 A | 9/1992 |
| JP | 6-80946 A | 3/1994 |
| JP | 7-140348 A | 6/1995 |
| JP | 9-241352 A | 9/1997 |
| JP | 10-206682 A | 8/1998 |
| JP | 11-209682 A | 8/1999 |
| JP | 2000-206341 A | 7/2000 |
| JP | 2001-510492 A | 7/2001 |
| JP | 2002-173661 A | 6/2002 |
| JP | 2003-89779 A | 3/2003 |
| JP | 2004-99863 A | 4/2004 |
| JP | 2004099863 A * | 4/2004 |
| JP | 2005-281073 A | 10/2005 |
| JP | 2005-281494 | 10/2005 |
| JP | 2005-281501 A | 10/2005 |
| JP | 2005-281528 A | 10/2005 |
| JP | 2006070170 A * | 3/2006 |
| WO | WO-2005/007751 A1 | 1/2005 |

OTHER PUBLICATIONS

Wacker Silicones Silres MSE 100 Technical Data Sheet.*
Khabashesku et al, Matrix isolation infrared and density functional theoretical studies of organic silanones (CH3O)2Si=O and (C6H5)2Si=O, Journal of Organometallic Chemistry 566 (1998) 45-59.*
Dixon et al, Electrochemical Methoxylation of an HF-Etched Porous Silicon Surface, J. Phys. Chem. B 1998, 102, 1768-1774.*
Extended European Search Report in European Application No. 05780357.9, dated Oct. 8, 2009.

* cited by examiner

*Primary Examiner* — Randy Gulakowski
*Assistant Examiner* — Lindsay Nelson
(74) *Attorney, Agent, or Firm* — Connolly Bove Lodge & Hutz LLP (57) ABSTRACT

To provide adhesive compositions for optical fibers which are curable with moisture and excellent in adhesiveness and resistance to moist heat.
An Adhesive composition for optical fibers containing (A) a component having a reactive silicon containing group which contains (e) a compound obtained by reacting (a) an epoxy compound having at least one epoxy group with (b) a silane coupling agent having both a reactive silicon containing group and an epoxy-reactive group, wherein the component (A) has a molecular weight of 1000 or below per reactive silicon containing group; and an adhesive composition for optical fibers containing an alkylsilyl ester and (B) a compound other than the alkylsilyl ester which has at least one reactive silicon containing group.

8 Claims, 1 Drawing Sheet

FIG.1

ADHESIVE COMPOSITIONS FOR OPTICAL FIBERS

CROSS-REFERENCE TO RELATED APPLICATIONS

This application is a National Stage of PCT/JP2005/015203 filed Aug. 22, 2005 which in turn claims priority from Japanese Applications 2004-255395 filed Sep. 2, 2004 and 2004-255832, filed Sep. 2, 2004 disclosures of which are incorporated herein by reference.

TECHNICAL FIELD

The present invention relates to an adhesive composition for optical fibers. More particularly, the invention relates to an adhesive composition for bonding optical fibers to ferrules.

BACKGROUND ART

The growing popularity of the Internet in recent years has made technology that increases the communications bandwidth more important, leading to a rise in the use of optical fiber networks. The coupling technology most commonly used today for the assembly of optical materials and optical components employed in such optical communications systems involves the use of connectors to connect one optical fiber to another. Adhesive compositions for securing the optical fibers to the ferrule within such a connector are required to have a high adhesive strength and reliability. In particular, when the optical fibers are bonded to a connector with an adhesive, because the optical fibers are always in a mutually pressure-bonded state under the action of a spring, the adhesive between the optical fibers and the ferrule constantly incurs shear stress. Moreover, the optical fibers are sometimes pulled in the lengthwise direction of the ferrules and subjected to large loads. The adhesive is thus required to have a high shear strength.

Moreover, because optical fibers are sometimes installed outdoors or in an attic, for example, the adhesive is also required to be capable of maintaining a sufficient bond strength even in a harsh environment, such as at high temperature and high humidity.

Quartz and glass have hitherto been used as optical fiber materials. However, plastic optical fibers (POF) have been developed which are low-cost, easy to work, and have a good flex strength, preventing the fibers from breaking easily. Such plastic optical fibers are being used in short-range communications applications, such as home networks and digital consumer electronics. Hence, adhesive compositions for optical fibers are required to be capable of bonding not only to glass, but also to plastic (primarily acrylic plastic).

Up until now, epoxy-based adhesives and the like have been used as adhesive compositions for optical fibers. However, recent research has shown there to be problems with the durability of epoxy adhesives. Also, the fact that epoxy adhesives must be heated to about 110° C. to cure complicates the work done at the site where connection is actually carried out. In addition, the use of epoxy adhesives may cause health problems such as rashes.

Patent Document 1 discloses an adhesive composition composed primarily of polysiloxane which is intended to provide excellent heat resistance, reduce bubble formation during curing, and eliminate defects such as clouding due to bubbles and the like.

Patent Document 1: JP 2002-173661 A

DISCLOSURE OF THE INVENTION

Problems to be Solved by the Invention

However, because the adhesive composition described in Patent Document 1 is composed primarily of polysiloxane, when held for a long time in a high-humidity environment, moisture may infiltrate, lowering the bond strength.

It is therefore an object of the present invention to provide an adhesive composition for optical fibers which is moisture-curable and has excellent adhesive properties and excellent resistance to moist heat.

Means to Solve the Problems

As a result of extensive investigations, the inventors have discovered that adhesive compositions for optical fibers containing a reactive silicon-containing group-bearing compound that includes a compound obtained by reacting an epoxy compound with a silane coupling agent, the reactive silicon-containing group-bearing compound having a molecular weight per reactive silicon-containing group thereon of 1,000 or less, are moisture-curable and have excellent adhesive properties and an excellent resistance to moist heat. The inventors have also found that by including an alkylsilyl ester and a reactive silicon-containing group-bearing compound, other than the alkylsilyl ester, having at least one reactive silicon-containing group, an adhesive composition for optical fibers which has excellent adhesive properties and an excellent resistance to moist heat is obtained. The inventors ultimately arrived at the present invention on the basis of these findings.

That is, the invention provides (1) to (13) below.

(1) An adhesive composition for optical fibers, comprising:
a reactive silicon-containing group-bearing compound (A) which includes a compound (c) formed by reacting an epoxy compound (a) having at least one epoxy group with a silane coupling agent (b) having a reactive silicon-containing group and a reactive group to react with an epoxy group,
wherein the reactive silicon-containing group-bearing compound (A) has a molecular weight per reactive silicon-containing group of 1,000 or less.

(2) The adhesive composition for optical fibers of (1) above, wherein the epoxy compound (a) has at least one aromatic ring.

(3) The adhesive composition for optical fibers of (1) or (2) above, wherein the reactive silicon-containing group on the reactive silicon-containing group-bearing compound (A) is a hydrolyzable silicon-containing group.

(4) The adhesive composition for optical fibers of any one of (1) to (3) above, wherein the silane coupling agent (b) is an iminosilane compound.

(5) An adhesive composition for optical fibers, comprising:
an alkylsilyl ester, and
a reactive silicon-containing group-bearing compound (B), other than the alkylsilyl ester, having at least one reactive silicon-containing group.

(6) The adhesive composition for optical fibers of (5) above, wherein the alkylsilyl ester is a methylsilyl ester monomer and/or oligomer.

(7) The adhesive composition for optical fibers of (5) or (6) above, wherein the reactive silicon-containing group on the reactive silicon group-bearing compound (B) is a hydrolyzable silicon-containing group.

(8) The adhesive composition for optical fibers of any one of (5) to (7) above, wherein the reactive silicon-containing group-bearing compound (B) has at least one aromatic ring.

(9) The adhesive composition for optical fibers of any one of (5) to (8) above, wherein the reactive silicon-containing group-bearing compound (B) is obtained by reacting an epoxy compound (d) having at least one epoxy group with a compound (e) having at least one reactive group to react with an epoxy group.

(10) The adhesive composition for optical fibers of (9) above, wherein the epoxy compound (d) is an aromatic epoxy compound and the compound (e) is an iminosilane compound.

(11) The adhesive composition for optical fibers of (9) above, wherein the epoxy compound (d) is an epoxy silane compound and the compound (e) is an aromatic amine compound.

(12) The adhesive composition for optical fibers of any one of (5) to (11) above which comprises from 1 to 300 parts by weight of the reactive silicon-containing group-bearing compound (B) per 100 parts by weight of the alkylsilyl ester.

(13) The adhesive composition for optical fibers of any one of (1) to (12) above which further comprises a curing catalyst.

EFFECTS OF THE INVENTION

The adhesive composition for optical fibers of the invention is moisture-curable and has excellent adhesive properties and excellent resistance to moist heat.

LEGEND

1: optical fiber
2: optical fiber core
3: optical fiber cladding
4: polymer coating
6: adhesive layer
7: ferrule
8: flange

BEST MODE FOR CARRYING OUT THE INVENTION

The present invention is described below in detail.
The adhesive composition for optical fibers according to a first aspect of the invention (also referred to below as the "composition of the first aspect of the invention") includes a reactive silicon-containing group-bearing compound (A) which contains a compound (c) formed by reacting an epoxy compound (a) having at least one epoxy group with a silane coupling agent (b) having a reactive silicon-containing group and a reactive group to react with an epoxy group. The reactive silicon-containing group-bearing compound (A) has a molecular weight per reactive silicon-containing group of 1,000 or less.

The epoxy compound (a) used in the composition of the first aspect of the invention is a compound having at least one epoxy group. Specific examples include glycidyl ether-type epoxy compounds obtainable by reacting a polyphenol such as bisphenol A, bisphenol F, bisphenol S, hexahydrobisphenol A, tetramethyl bisphenol A, pyrocatechol, resorcinol, cresol novolak, tetrabromobisphenol A, trihydroxybiphenyl, bisresorcinol, bisphenol hexafluoroacetone, tetramethyl bisphenol F, bixylenol or dihydroxynaphthalene with epichlorohydrin; polyglycidyl ether-type epoxy compounds obtainable by reacting an aliphatic polyol such as glycerol, neopentyl glycol, ethylene glycol, propylene glycol, butylene glycol, hexylene glycol, polyethylene glycol or polypropylene glycol with epichlorohydrin; glycidyl ether ester-type epoxy compounds obtainable by reacting a hydroxycarboxylic acid such as p-oxybenzoic acid or β-oxynaphthoic acid with epichlorohydrin; polyglycidyl ester-type epoxy compounds derived from polycarboxylic acids such as phthalic acid, methylphthalic acid, isophthalic acid, terephthalic acid, tetrahydrophthalic acid, hexahydrophthalic acid, endomethylenetetrahydrophthalic acid, endomethylenehexahydrophthalic acid, trimellitic acid and polymeric fatty acids; glycidylamino glycidyl ether-type epoxy compounds derived from aminophenol, aminoalkylphenols or the like; glycidylamino glycidyl ester-type epoxy compounds derived from aminobenzoic acid; glycidyl amine-type epoxy compounds derived from aniline, toluidine, tribromoaniline, xylylenediamine, diaminocyclohexane, bisaminomethylcyclohexane, 4,4'-diaminodiphenylmethane, 4,4'-diaminodiphenylsulfone or the like; epoxy compounds such as epoxidized polyolefins, glycidyl hydantoin, glycidyl alkylhydantoin and triglycidyl cyanurate; and monoepoxy compounds such as butyl glycidyl ether, phenyl glycidyl ether, alkylphenyl glycidyl ethers, glycidyl benzoate, and styrene oxide. Any one or mixtures of two or more thereof may be used.

For the cured composition to have an excellent mechanical strength and an excellent moist heat resistance, it is preferable that the epoxy compound (a) has at least one aromatic ring. Bisphenol A-type epoxy compounds and bisphenol F-type epoxy compounds are especially preferred on account of their easy availability and the good balance in the properties (performance) of the cured composition.

In this specification, "resistance to moist heat" refers to the property of being able to maintain good adhesive properties even when held for a long time in a high-humidity or high-temperature, high-humidity environment.

For the adhesive composition of the invention to have a low viscosity and thus a good workability and for the cured composition to have a good heat resistance, it is advantageous that the epoxy compound (a) have an epoxy equivalent weight of preferably 50 to 500, and more preferably 100 to 400.

The epoxy compound (a) used in the inventive composition may be either a commercially available product or may be synthesized. No particular limitation is imposed on the synthesis conditions; that is, synthesis may be carried out under commonly used conditions.

The silane coupling agent (b) used in the composition of the first aspect of the invention is not subject to any particular limitation, provided it is a compound having a reactive silicon-containing group and a reactive group that reacts with an epoxy group.

The reactive silicon-containing group is a silicon-containing group which has from one to three reactive groups attached to the silicon atom and which is capable of crosslinking by causing a reaction to occur in the presence of moisture or a crosslinking agent, and with the use of a catalyst or the like if necessary. Examples include halogenated silicon-containing groups, hydrogenated silicon-containing groups and hydrolyzable silicon-containing groups. The silane coupling agent (b) may have one or more such reactive silicon-containing groups.

Of the foregoing reactive silicon-containing groups, hydrolyzable silicon-containing groups are preferred because they enable moisture-curable compositions of excellent shelf stability to be obtained.

Halogenated silicon-containing groups have from one to three halogen groups attached to the silicon atom. Specific examples include the chlorodimethylsilyl group, the dichloromethylsilyl group and the trichlorosilyl group.

Hydrogenated silicon-containing groups have from one to three hydrogen atoms attached to the silicon atom. Specific examples include the hydrodimethylsilyl group, the dihydromethylsilyl group and the trihydrosilyl group.

Halogenated silicon-containing groups are capable of crosslinking by triggering, together with the above hydrogenated silicon-containing group, for example, a dehydrohalogenation reaction so as to form a bond. Halogenated silicon-containing groups are also capable of crosslinking by causing a metathesis reaction with a Grignard reagent, then triggering a reaction involving the removal of halogenated metal so as to form a silicon-carbon bond. Halogenated silicon-containing groups are additionally capable of crosslinking by, with the use of an alkali metal or magnesium, triggering a reductive silylation reaction with an aromatic hydrocarbon, a conjugated diene, an aromatic aldehyde, a ketone, a carboxylic acid, an ester or an imine so as to form a silicon-carbon bond.

Hydrogenated silicon-containing groups are capable of crosslinking by inducing a dehydrohalogenation reaction with the above halogenated silicon-containing groups so as to form a bond. Alternatively, hydrogenated silicon-containing group are capable of crosslinking by triggering a hydrosilylation reaction with a compound having an unsaturated carbon bond so as to form a silicon-carbon bond.

Hydrolyzable silicon-containing groups are silicon-containing groups which have from one to three hydroxyl groups and/or hydrolyzable groups attached to the silicon atom and which are capable of crosslinking by inducing a condensation reaction in the presence of moisture or a crosslinking agent, with the use of a catalyst or the like if necessary, to form a siloxane bond. Illustrative examples include alkoxysilyl groups, alkenyloxysilyl groups, acyloxysilyl groups, aminosilyl groups, aminoxysilyl groups, oxime silyl groups and amidosilyl groups. Suitable use can be made of alkoxysilyl groups, alkenyloxysilyl groups, acyloxysilyl groups, aminosilyl groups, aminoxysilyl groups, oxime silyl groups, amidosilyl groups and the like of the following formulas.

[Chemical Formula 1]

Of these, alkoxysilyl groups are preferred because they are easy to handle.

The alkoxy group attached to the silicon atom on the alkoxysilyl group, while not subject to any particular limitation, is preferably methoxy, ethoxy or propoxy because of the ready availability of the starting materials.

Groups other than the alkoxy group that attach to the silicon atom on the alkoxysilyl group are not subject to any particular limitation. Suitable examples include hydrogen and alkyl, alkenyl or arylalkyl groups having up to 20 carbon atoms, such as methyl, ethyl, propyl and isopropyl.

The silane coupling agent (b) has a reactive group to react with an epoxy group. The reactive group is exemplified by amino, imino, ureido, mercapto and acid anhydride groups.

Illustrative examples of the silane coupling agent (b) include aminosilane compounds such as γ-aminopropyltrimethoxysilane, γ-aminopropyltriethoxysilane, γ-aminopropylmethyldimethoxysilane, γ-aminopropylethyldiethoxysilane, bistrimethoxysilylpropylamine, bistriethoxysilylpropylamine, bismethoxydimethoxysilylpropylamine, bisethoxydiethoxysilylpropylamine, N-β-(aminoethyl)-γ-aminopropyltrimethoxysilane, N-β-(aminoethyl)-γ-aminopropylmethyldimethoxysilane, N-β-(aminoethyl)-γ-aminopropyltriethoxysilane, N-β-(aminoethyl)-γ-aminopropylethyldiethoxysilane, 3,3-dimethyl-4-aminobutyltrimethoxysilane and 3,3-dimethyl-4-aminobutylmethyldimethoxysilane; and iminosilane compounds such as (N-cyclohexylaminomethyl)methyldiethoxysilane, (N-cyclohexylaminomethyl)triethoxysilane, (N-phenylaminomethyl)methyldimethoxysilane, (N-phenylaminomethyl)trimethyloxysilane, the compound of formula (1) below, and N-phenyl-3-aminopropyltrimethoxysilane of formula (2) below.

[Chemical Formula 2]

Additional examples include ureidosilane compounds such as γ-ureidopropyltrimethoxysilane; and mercaptosilane compounds such as γ-mercaptopropyltrimethoxysilane, γ-mercaptopropyltriethoxysilane, γ-mercaptopropylmethyldimethoxysilane and γ-mercaptopropylmethyldiethoxysilane.

These may be used singly or as a combination of two or more thereof.

The silane coupling agent (b) used in the inventive composition may be either a commercially available product or may be synthesized. No particular limitation is imposed on the synthesis conditions. Synthesis may be carried out by a known method and under known conditions.

The compound (c) used in the composition of the first aspect of the invention is obtainable by reacting the above-described epoxy compound (a) with the above-described silane coupling agent (b). Because the epoxy compound (a) is used as a starting material, the compound (c) has a hydroxy group derived from an epoxy group. As a consequence, in the resulting composition of the first aspect of the invention, intermolecular hydrogen bonds form between this hydroxyl group and other hydroxy groups and/or silanol groups which have not taken part in crosslinking, thereby improving the mechanical strength, e.g., shear strength, and conferring excellent adhesive properties and an excellent resistance to moist heat.

A first preferred embodiment of the compound (c) is a compound obtainable by reacting the above-described iminosilane compound with an epoxy compound having at least one aromatic ring (aromatic epoxy compound). An example is a compound obtainable by reacting an aromatic epoxy compound having two epoxy groups per molecule with one equivalent of an iminosilane compound having one imino group per molecule, such as the compound of formula (3) below obtainable by reacting bisphenol A glycidyl ether with one equivalent of the iminosilane compound having the structure shown in the formula (1) above.

[Chemical Formula 3]

A second preferred embodiment of the compound (c) is a compound obtained by reacting an aromatic epoxy compound having two epoxy groups per molecule with two equivalents of an iminosilane having one imino group per molecule. An example is the compound of formula (4) below obtainable by reacting bisphenol A glycidyl ether with two equivalents of the compound having the structure shown in the formula (1) above.

The reactive silicon-containing group-bearing compound (A) used in the composition of the first aspect of the invention includes at least the above compound (c) and may also include a reactive silicon-containing group-bearing compound other than the compound (c).

For moisture curability and good shelf stability, it is preferable for the reactive silicon-containing group in the above-described reactive silicon-containing group-bearing compound (A) to be a hydrolyzable silicon-containing group.

Each of the reactive silicon-containing group-bearing compounds included in the reactive silicon-containing group-bearing compound (A) has a number-average molecular weight per reactive silicon-containing group of not more than 1,000. As a result, the composition of the first aspect of the invention has a high crosslink density in the cured form thereof, providing improved mechanical strength such as shear strength, and also has excellent adhesive properties and resistance to moist heat. For these properties to be even better, it is desirable that the reactive silicon-containing group-bearing compound (A) have a number-average molecular weight per reactive silicon-containing group of preferably not more than 900, and more preferably not more than 800.

To keep the crosslink density from being too high, it is desirable for the reactive silicon-containing group-bearing compound (A) to have a number-average molecular weight per reactive silicon-containing group of preferably at least 50, and more preferably at least 70.

Reactive silicon-containing group-bearing compounds other than the compound (c) that may be included in the above reactive silicon-containing group-bearing compound (A) are exemplified by silane coupling agents or the like.

Examples of such silane coupling agents that are suitable for use include, but are not limited to, the compounds that have already been mentioned in connection with the above-described silane coupling agent (b); and epoxy silane compounds such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane and γ-glycidoxypropylmethyldiethoxysilane.

If the reactive silicon-containing group-bearing compound (A) includes a reactive silicon-containing group-bearing compound other than above the compound (c), it is preferable for the compound (c) to be included in a ratio, based on the overall reactive silicon-containing group-bearing compound (A), of from 5 to 99 wt %. At a content within this range, the adhesive properties and resistance to moist heat are excellent. For these properties to be even better, it is desirable that the content of the compound (c) be preferably from 10 to 90 wt %, and more preferably from 20 to 80 wt %.

[Chemical Formula 4]

The composition of the first aspect of the invention preferably includes also a curing catalyst.

The curing catalyst may be one that is commonly used for reactive silicon-containing group-bearing compounds. Specific examples include metal carboxylates such as zinc octanoate, iron octanoate, manganese octanoate, tin octanoate, zinc naphthenate, iron naphthenate, tin butanoate, tin caprylate and tin oleate; organotin compounds such as dibutyltin diacetate, dibutyltin dioctoate, dibutyltin dilaurate, dibutyltin dioleate, dioctyltin dilaurate, diphenyltin diacetate, dibutyltin oxide, the products obtained by reacting dibutyltin oxide with phthalic acid esters, dibutyltin dimethoxide, dibutyltin(triethoxysiloxy){bis(triethoxysiloxy) dibutyltin} and dibutyltin silicate; tin chelate compounds such as dibutyltin diacetylacetonate; titanic acid esters such as tetraethoxytitanium, tetrapropoxytitanium, tetrabutoxytitanium, tetra-2-ethylhexyloxytitanium and tetraisopropenyloxytitanium; titanium chelate compounds such as diisopropoxytitanium bis(acetylacetonate), diisopropoxytitanium bis(ethyl acetoacetate), 1,3-propanedioxytitanium bis(acetylacetonate), 1,3-propanedioxytitanium bis(ethyl acetoacetate) and titanium tris(acetylacetonate); zirconium alkoxides such as tetraisopropoxyzirconium, tetrabutoxyzirconium and tributoxyzirconium stearate; zirconium chelate compounds such as zirconium tetra(acetylacetonate); aluminum alkoxides such as triethoxyaluminum, tripropoxyaluminum and tributoxyaluminum; and aluminum chelate compounds such as diisopropoxyaluminum (ethyl acetoacetate), aluminum tris (acetylacetonate) and aluminum tris(ethyl acetoacetate).

Additional examples of suitable curing catalysts include any of the following amine compounds, as well as carboxylic acid salts thereof: primary amines such as butylamine, hexylamine, octylamine, dodecylamine, oleylamine, cyclohexylamine and benzylamine; secondary amines such as dibutylamine; polyamines such as diethylenetriamine, triethylenetetramine, guanidine, diphenylguanidine and xylylenediamine; cyclic amines such as triethylenediamine, morpholine, N-methylmorpholine, 2-ethyl-4-methylimidazole and 1,8-diazabicyclo[5.4.0]-7-undecene; aminoalcohol compounds such as monoethanolamine, diethanolamine and triethanolamine; and aminophenol compounds such as 2,4,6-tris(dimethylaminomethyl)phenol. Further examples of suitable curing catalysts include quaternary ammonium salts such as benzyltriethylammonium acetate; low-molecular-weight amide resins obtainable from an excess of polyamine and a polybasic acid; and products obtained by reacting an excess of a polyamine with an epoxy compound.

These curing catalysts may be used singly or as a combination of two or more thereof.

Of the above, to discourage vaporization during storage and use, a metal compound is preferred. Organotin compounds, tin chelate compounds and titanic oxide esters are especially preferred because an excellent catalytic performance can be obtained with a very small amount of addition.

The curing catalyst content is preferably from 1 to 50 parts by weight per 100 parts by weight of the reactive silicon-containing group-bearing compound (A). At a curing catalyst content within this range, the curing catalyst can manifest a sufficient action without presenting any difficulty in terms of compatibility with the other ingredients or causing localized heat generation or bubble formation during curing. For these properties to be even better, it is advantageous that the content of the curing catalyst be preferably from 1 to 40 parts by weight, and more preferably from 1 to 30 parts by weight.

If necessary, the composition of the first aspect of the invention may also include, within a range that does not compromise the objects of the invention, various additives such as fillers, reaction retarders, antidegradants, antioxidants, pigments (dyes), plasticizers, thixotropic agents, ultraviolet absorbers, flame retardants, solvents, surfactants (including leveling agents), dispersants, dehydrating agents, tackifiers and antistatic agents.

Suitable fillers are exemplified by organic and inorganic fillers in various forms. Specific examples include fumed silica, calcined silica, precipitated silica, pulverized silica and fused silica; diatomaceous earth; iron oxide, zinc oxide, titanium oxide, barium oxide and magnesium oxide; calcium carbonate, magnesium carbonate and zinc carbonate; pyrophyllite clay, kaolin clay and calcined clay; carbon black; as well as fatty acid-treated, resin acid-treated, urethane compound-treated or fatty acid ester-treated products of any of the above. For cured composition to have good physical properties, it is preferable that the content of the filler be preferably not more than 90 wt % of the overall composition.

The reaction retarder is exemplified by alcohol-type compounds.

The antidegradant is exemplified by hindered phenol-type compounds.

The antioxidant is exemplified by butylhydroxytoluene (BHT) and butylhydroxyanisole (BHA).

Examples of suitable pigments include inorganic pigments such as titanium oxide, zinc oxide, ultramarine, red iron oxide, lithopone, lead, cadmium, iron, cobalt, aluminum, hydrochlorides and sulfates; and organic pigments such as azo pigments, phthalocyanine pigments, quinacridone pigments, quinacridonequinone pigments, dioxazine pigments, anthrapyrimidine pigments, anthanthrone pigments, indanthrone pigments, flavanthrone pigments, perylene pigments, perinone pigments, diketopyrrolopyrrole pigments, quinonaphthalone pigments, anthraquinone pigments, thioindigo pigments, benzimidazolone pigments, isoindoline pigments and carbon black.

Examples of suitable plasticizers include dioctyl phthlate (DOP) and dibutyl phthalate (DBP); dioctyl adipate and isodecyl succinate; diethylene glycol dibenzoate and pentaerythritol ester; butyl oleate and methyl acetylrisinoleate; tricresyl phosphate and trioctyl phosphate; and polyester of adipic acid propylene glycol polyester of adipic acid butylene glycol. These may be used singly or as mixtures of two or more thereof. For good workability, it is preferable that the plasticizer content be no more than 50 parts by weight per 100 parts by weight of the reactive silicon-containing group-bearing compound (A).

Examples of suitable thixotropic agents include Aerosil (available from Nippon Aerosil Co., Ltd.), and Disparon (available from Kusumoto Kasei KK).

Examples of suitable tackifiers include terpene resins, phenolic resins, terpene-phenolic resins, rosins and xylene resins.

Examples of suitable flame retardants include chloroalkyl phosphates, dimethyl methylphosphonate, bromine-phosphorus compounds, ammonium polyphosphate, neopentyl-bromide-polyethers and brominated polyethers.

Examples of suitable antistatic agents generally include quaternary ammonium salts; and hydrophilic compounds such as polyglycols and ethylene oxide derivatives.

The composition of the first aspect of the invention is basically moisture-curable, and can also be cured by heating. When employed in the moisture-curable form, it is very easy to use because there is no need for heating. On the other hand, when used in a heat-curable form, it has a short curing time and an excellent deep cure. The moisture-curable form or the heat-curable form may thus be suitably selected according to the intended application and place of use (work site) for the composition of the first aspect of the invention.

The composition of the first aspect of the invention may be employed as either a one-part or a two-part adhesive composition for optical fibers. When employed as a one-part adhesive composition, because there is no need to mix the base agent and the curing agent on site, the composition has an excellent ease of use. On the other hand, when employed as a two-part adhesive composition, the curing time is short and the composition has excellent deep cure. Therefore, a one-part or a two-part adhesive composition may be suitably selected according to the intended application and place of use for the composition of the first aspect of the invention.

When the composition of the first aspect of the invention is to be used as a two-part adhesive composition, it may be prepared as a two-part adhesive composition composed of a base agent containing the above-described reactive silicon-containing group-bearing compound (A), and a curing agent. The curing catalyst and additives that are optionally added may be included on either or both the base agent side and the curing agent side.

Water or some other active hydrogen-bearing compound or the like may be used as the curing agent, although the use of water is preferred from the standpoint of cost and handleability.

The method of preparing the composition of the first aspect of the invention is not subject to any particular limitation. For example, the composition may be obtained by thoroughly mixing, and thereby uniformly dispersing, the respective ingredients described above and any optional additives in a mixing apparatus such as a ball mill, preferably at reduced pressure or under an inert atmosphere.

As noted above, the composition of the first aspect of the invention is moisture-curable, and has excellent adhesive properties and an excellent resistance to moist heat.

The composition of the first aspect of the invention can easily bond like materials to each other, including ceramic materials, glass materials, plastic materials, metal materials, organic-inorganic composite materials, semiconductor materials and dielectric materials, or any combination of these dissimilar materials, and are particularly suitable for bonding materials to be held in high-temperature, high-humidity environments. Because it has excellent properties like those mentioned above, the composition of the first aspect of the invention is ideal for bonding together optical fibers and ferrules.

The adhesive composition for optical fibers of the second aspect of the invention (also referred to below as the "composition of the second aspect of the invention") is composed of an alkylsilyl ester and a reactive silicon-containing group-bearing compound (B), other than the alkylsilyl ester, having at least one reactive silicon-containing group.

The alkylsilyl ester used in the composition of the second aspect of the invention is a compound of formula (5) below and/or an oligomer thereof. By using such an alkylsilyl ester as the resin component in the composition of the second aspect of the invention, a higher crosslink density is achieved, the mechanical strength of the cured composition improves, and an adhesive composition having excellent adhesive properties and resistance to moist heat can be obtained.

[Chemical Formula 5]

(5)

In the formula, $R^1$ is an alkyl group of 1 to 6 carbons which is preferably methyl, ethyl, n-propyl or isopropyl, and more preferably methyl or ethyl. $R^2$ is an alkyl group of 1 to 3 carbons which is preferably methyl, ethyl, n-propyl or isopropyl, and more preferably methyl or ethyl.

Preferred examples of the alkylsilyl ester include the methylsilyl ester of formula (6) below and oligomers thereof.

These may be used singly or as combinations of two or more thereof.

[Chemical Formula 6]

(6)

If the alkylsilyl ester is an oligomer of a compound of formula (5), it will have a number-average molecular weight of preferably 90 to 3,000. At a molecular weight within this range, the viscosity is low, providing an excellent ease of use, and the reactivity is high. For these properties to be even better, it is more preferable that the oligomer have a number-average molecular weight of 90 to 2,000.

If, in particular, the alkylsilyl ester is an oligomer of the methylsilyl ester of formula (6), a number-average molecular weight of 90 to 3,000 is preferable because the viscosity is low, providing an excellent ease of use, and the reactivity is high. For these properties to be even better, the methylsilyl ester oligomer will have a number-average molecular weight of more preferably 90 to 2,000, and even more preferably 90 to 1,500.

The alkylsilyl ester may be a commercially available product, or may be synthesized. No particular limitation is imposed on the synthesis conditions. Synthesis may be carried out by a known method and under known conditions.

The reactive silicon-containing group-bearing compound (B) used in the composition of the second aspect of the invention is not subject to any particular limitation, provided it is a compound other than the above alkylsilyl ester, which has at least one reactive silicon-containing group thereon.

The reactive silicon-containing group in this reactive silicon-containing group-bearing compound (B) is the same as that in the above-described silane coupling agent (b).

For the resulting cured composition to have a good mechanical strength and a good resistance to moist heat, it is preferable that the reactive silicon-containing group-bearing compound (B) have at least one aromatic ring.

The reactive silicon-containing group-bearing compound (B) is exemplified by compounds (referred to below as "compound (f)") obtainable by reacting an epoxy compound (d) having at least one epoxy group with a compound (e) having at least one reactive group which reacts with an epoxy group, alkoxysilane condensates, and silane coupling agents.

These may be used singly or as combinations of two or more thereof.

Of these, the use of the compound (f) is preferred for obtaining compositions having excellent adhesive properties and excellent resistance to moist heat.

A first preferred embodiment of the compound (f) is a compound obtained by reacting an iminosilane compound with an aromatic epoxy compound.

The iminosilane compound is not subject to any particular limitation, provided it is a compound having at least one reactive silicon-containing group and at least one imino group. Specific examples include (N-cyclohexylaminomethyl)methyldiethoxysilane, (N-cyclohexylaminomethyl)triethoxysilane, (N-phenylaminomethyl)methyldimethoxysilane, (N-phenylaminomethyl)trimethyloxysilane, the compound of the formula (3) above, and the N-phenyl-3-aminopropyltrimethoxysilane of the formula (4) above.

The aromatic epoxy compound is a compound having at least one epoxy group and at least one aromatic ring. Specific examples include glycidyl ether-type epoxy compounds obtainable by reacting a polyphenol such as bisphenol A or bisphenol F with epichlorohydrin; glycidylamino glycidyl ether-type epoxy compounds derived from aminophenol, aminoalkylphenols or the like; glycidylamino glycidyl ester-type epoxy compounds derived from aminobenzoic acid; and glycidylamine-type epoxy compounds derived from aniline, toluidine, tribromoaniline, xylylenediamine, 4,4'-diaminodiphenylmethane, 4,4'-diaminodiphenylsulfone or the like.

The above-described first preferred embodiment of the compound (f) is exemplified by compounds obtainable by reacting an aromatic epoxy compound having two epoxy groups per molecule with one equivalent of an iminosilane compound having one imino group per molecule. A more specific example is the compound of the above formula (3) obtainable by reacting bisphenol A glycidyl ether with one equivalent of the iminosilane compound having the construction shown in the above formula (1).

The above-described first preferred embodiment of the compound (f) is also exemplified by compounds obtainable by reacting an aromatic epoxy compound having two epoxy groups per molecule with two equivalents of an iminosilane compound having one imino group per molecule. A more specific example is the compound of the above formula (4) obtainable by reacting bisphenol A glycidyl ether with two equivalents of the iminosilane compound having the construction shown in the above formula (1).

A second preferred embodiment of the compound (f) is a compound obtained by reacting an epoxysilane compound with an aromatic amine compound.

The epoxysilane compound is not subject to any particular limitation, provided it is a compound having at least one reactive silicon-containing group and at least one epoxy group. Specific examples include γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane and γ-glycidoxypropylmethyldiethoxysilane.

The aromatic amine compound is a compound having at least one amino group and/or imino group and at least one aromatic ring. Specific examples include methylenedianiline (MDA), diaminodiphenylsulfone, diaminodiphenyl ether, diaminodiphenyl ketone, phenylenediamine, xylylenediamine and 2,2-bis(4-aminophenyl)propane.

The above-described second preferred embodiment of the compound (f) is exemplified by compounds obtainable by reacting an aromatic amine compound having two amino groups per molecule with four equivalents of an epoxysilane compound having one epoxy group per molecule. A more specific example is the compound of formula (7) below obtainable by reacting methylenedianiline (MDA) with four equivalents of 3-glycidoxypropyltrimethoxoysilane.

[Chemical Formula 7]

(7)

The above-mentioned alkoxysilane condensate is not subject to any particular limitation. For example, tetraalkoxysilane condensates, as well as epoxy modified products and amino-modified products thereof or the like, may be suitably used. It is preferable for the alkoxysilane condensate to have a number-average molecular weight of about 200 to 3,000.

Any known silane coupling agent may be used without particular limitation as the above silane coupling agent. Illustrative examples include, aside from the above-described iminosilane compounds and the above-described epoxysilane compounds, ureidosilane compounds such as γ-ureidopropyltrimethoxysilane; aminosilane compounds such as γ-aminopropyltrimethoxysilane, γ-aminopropyltriethoxysilane, γ-aminopropylmethyldimethoxysilane, γ-aminopropylethyldiethoxysilane, bistrimethoxysilylpropylamine, bistriethoxysilylpropylamine, bismethoxydimethoxysilylpropylamine, bisethoxydiethoxysilylpropylamine, N-β-(aminoethyl)-γ-aminopropyltrimethoxysilane, N-β-(aminoethyl)-γ-aminopropylmethyldimethoxysilane, N-β-(aminoethyl)-γ-aminopropyltriethoxysilane, N-β-(aminoethyl)-γ-aminopropylethyldiethoxysilane, 3,3-dimethyl-4-aminobutyltrimethoxysilane and 3,3-dimethyl-4aminobutylmethyldimethoxysilane; mercaptosilane compounds such as γ-mercaptopropyltrimethoxysilane, γ-mercaptopropyltriethoxysilane, γ-mercaptopropylmethyldimethoxysilane and γ-mercaptopropylmethyldiethoxysilane; (poly)sulfide silane compounds such as bis(triethoxysilylpropyl)tetrasulfide and bis(triethoxysilylpropyl)disulfide; vinylsilane compounds such as vinyltrichlorosilane, vinyltrimethoxysilane, vinyltriethoxysilane and vinyltris(β-methoxyethoxy)silane; and methacryloxysilane compounds such as γ-methacryloxypropylmethyldimethoxysilane, γ-methacryloxypropyltrimethoxysilane, γ-methacryloxypropylmethyldiethoxysilane and γ-methacryloxypropyltriethoxysilane.

Additional examples include carboxysilane compounds such as β-carboxyethyltriethoxysilane, β-carboxyethylphenylbis (2-methoxyethoxy)silane and N-β-(carboxymethyl) aminoethyl-γ-aminopropyltrimethoxysilane; isocyanatosilane compounds such as γ-isocyanatopropyltrimethoxysilane, γ-isocyanatopropyltriethoxysilane, γ-isocyanatopropylmethyldiethoxysilane, γ-isocyanatopropylmethyldimethoxysilane, γ-isocyanatoethyltrimethoxysilane, γ-isocyanatoethyltriethoxysilane, γ-isocyanatoethylmethyldiethoxysilane and γ-isocyanatoethylmethyldimethoxysilane; and halosilane compounds such as γ-chloropropyltrimethoxysilane.

These may be used singly or as combinations of two or more thereof.

If the reactive silicon-containing group-bearing compound (B) includes also a reactive silicon-containing group-bearing compound other than the above compound (f), it is preferable for the compound (f) to be included in a ratio, based on the overall reactive silicon-containing group-bearing compound (B), of from 5 to 99 wt %. At a content within this range, the adhesive properties and resistance to moist heat are excellent. For these properties to be even better, it is desirable that the content of the compound (f) be preferably from 10 to 90 wt %, and more preferably from 20 to 80 wt %.

The content of the reactive silicon-containing group-bearing compound (B) is preferably from 1 to 300 parts by weight per 100 parts by weight of the alkylsilyl ester. At a compound (B) content within this range, the composition of the second aspect of the invention has excellent adhesive properties and an excellent resistance to moist heat. For these properties to be even better, the content of the reactive silicon-containing group-bearing compound (B) per 100 parts by weight of the alkylsilyl ester is more preferably from 50 to 300 parts by weight, and even more preferably from 100 to 300 parts by weight.

The composition of the second aspect of the invention preferably includes also a curing catalyst. Curing catalysts that may be used here are the same as those mentioned above which may be used in the composition of the first aspect of the invention.

The curing catalyst content is preferably from 1 to 50 parts by weight per 100 parts by weight of the alkylsilyl ester and the reactive silicon-containing group-bearing compound (B) combined. At a curing catalyst content within this range, the curing catalyst can exhibit a sufficient action, without presenting any difficulty in terms of compatibility with the other ingredients or causing localized heat generation or bubble formation during curing. For these properties to be even better, it is desirable that the content of the curing catalyst be preferably from 1 to 40 parts by weight, and more preferably from 1 to 30 parts by weight.

If necessary, the composition of the second aspect of the invention may also include, within a range that does not compromise the objects of the invention, various additives such as fillers, reaction retarders, antidegradants, antioxidants, pigments (dyes), plasticizers, thixotropic agents, ultraviolet absorbers, flame retardants, solvents, surfactants (including leveling agents), dispersants, dehydrating agents, tackifiers and antistatic agents.

The composition of the second aspect of the invention is basically moisture-curable, and can also be cured by heating. When employed in the moisture-curable form, it is very easy to use because there is no need for heating. On the other hand, when used in a heat-curable form, it has a short curing time and an excellent deep cure. The moisture-curable form or the heat-curable form may thus be suitably selected according to the intended application and place of use (work site) for the composition of the second aspect of the invention.

The composition of the second aspect of the invention may be employed as either a one-part or a two-part adhesive composition for optical fibers. When employed as a one-part adhesive composition, because there is no need to mix the base agent and the curing agent on site, the composition has an excellent ease of use. On the other hand, when employed as a two-part adhesive composition, the curing time is short and the composition has excellent deep cure. Therefore, a one-part or a two-part adhesive composition may be suitably selected according to the intended application and place of use for the composition of the second aspect of the invention.

When the composition of the second aspect of the invention is to be used as a two-part adhesive composition, it may be prepared as a two-part adhesive composition composed of a base agent containing the above-described alkylsilyl ester and the reactive silicon-containing group-bearing compound (B), and a curing agent. The curing catalyst and additives that are optionally added may be included on either or both the base agent side and the curing agent side.

Water or some other active hydrogen-bearing compound may be used as the curing agent, although the use of water is preferred from the standpoint of cost and handleability.

The method of preparing the composition of the second aspect of the invention is not subject to any particular limitation. For example, the composition may be obtained by thoroughly mixing, and thereby uniformly dispersing, the respective ingredients described above and any optional additives in a mixing apparatus such as a ball mill, preferably at reduced pressure or under an inert atmosphere.

As noted above, the composition of the second aspect of the invention is moisture-curable, and has excellent adhesive properties and an excellent resistance to moist heat.

The composition of the second aspect of the invention can easily bond like materials to each other, including ceramic materials, glass materials, plastic materials, metal materials, organic-inorganic composite materials, semiconductor materials and dielectric materials, or any combination of these dissimilar materials, and are particularly suitable for bonding materials to be held in high-temperature, high-humidity environments. Because it has excellent properties like those mentioned above, the composition of the second aspect of the invention is well-suited for use in bonding optical fibers to ferrules.

EXAMPLES

The invention is illustrated more fully through the following examples. It is to be understood that these examples are not intended to limit the invention.

<Synthesis of Compound (c)>

Synthesis Examples 1 to 6

The ingredients shown in Table 1 below were mixed in the indicated proportions (parts by weight) and stirred under an inert gas atmosphere at 80° C. for 8 hours, thereby giving in the respective examples a compound corresponding to the above compound (c).

The silylation ratio shown in Table 1 for each synthesis example is the stoichiometric ratio of the number of molecules of the silane coupling agent (b) reacted to the total number of reactive groups on the epoxy compound (a), expressed as a percentage. For example, in Synthesis Example 2, one molecule of the silane coupling agent (b) is reacted with an epoxy compound (a) having two epoxy groups, so the silylation ratio is 50%.

The resulting compounds are presumed to be, in Synthesis Example 1, a mixture of the compound of the above formula (3) with unreacted Epoxy Compound 1; in Synthesis Example 2, the compound of the above formula (3); in Synthesis Example 3, a mixture of the compounds of the above formulas (3) and (4); in Synthesis Example 4, the compound of the above formula (4), in Synthesis Example 5, the compound of formula (8) below; and in Synthesis Example 6, the compound of formula (9) below.

[Chemical Formula 8]

The ingredients in Table 1 were as follows.
Epoxy Compound 1 (bisphenol A glycidyl ether): Epotote YD-128, trade name, produced by Toto Kasei KK.
Epoxy Compound 2 (bisphenol F glycidyl ether): Epotote YDF-170, trade name, produced by Toto Kasei KK.
Iminosilane compound (the compound of the formula (1) above): Alink-15, produced by Nippon Unicar Co., Ltd.

<Preparation and Evaluation of Two-Part Adhesive Composition>

Examples 1 to 6, and Comparative Examples 1 and 2

Liquid A ingredients shown in Table 2 below were mixed in the indicated proportions (parts by weight) and thoroughly dispersed using a stirrer, following which the entire amount of the Liquid B ingredient was added and thoroughly dispersed therein, giving the respective compositions shown in Table 2. In Comparative Example 2, a prior-art epoxy-type adhesive composition (produced by Muromachi Technos Co., Ltd. under the trade name Epotek 353ND) was used.

Each of the resulting compositions was evaluated as described below for cure rate (moisture curability), adhesive properties, and resistance to moist heat. The results are shown in Table 2.

(Evaluation of Cure Rate (Moisture Curability))

Each of the compositions obtained was held in a 20° C., 65% relative humidity atmosphere, and the tack-free time immediately following preparation of the composition was measured in accordance with the method described in JIS A5758-2004. The composition in Comparative Example 2 was heat-curable, and thus did not cure at room temperature.

(Evaluation of Adhesive Properties and Resistance to Moist Heat)

Test specimens were prepared in each example by arranging two glass plates (30 mm(L)×25 mm(W)×5 mm(T)) so that they overlap at one end by 3 mm over the entire 25 mm width, with a layer of adhesive composition therebetween, then heating and curing the composition at 110° C. for 1 hour. Using the resulting test specimen, the shear strength (initial) was measured in accordance with JIS K6852-1994.

A test specimen prepared in the same way as described above was held for 10 days in a 80° C., 95% RH atmosphere to induce deterioration. This specimen was then used to measure the shear strength (after moist heat deterioration) in the same way as described above.

TABLE 1

|  | Synthesis Example 1 | Synthesis Example 2 | Synthesis Example 3 | Synthesis Example 4 | Synthesis Example 5 | Synthesis Example 6 |
|---|---|---|---|---|---|---|
| Epoxy Compound 1 | 100 | 100 | 100 | 100 |  |  |
| Epoxy Compound 2 |  |  |  |  | 100 | 100 |
| Iminosilane compound | 32 | 64 | 96 | 128 | 70 | 140 |
| Silylation ratio | 25% | 50% | 75% | 100% | 50% | 100% |

TABLE 2

|  |  | EX 1 | EX 2 | EX 3 | EX 4 | EX 5 | EX 6 | CE 1 | CE 2 |
|---|---|---|---|---|---|---|---|---|---|
| Liquid A | Compound obtained in Syn. Ex. 1 | 100 |  |  |  |  |  |  |  |
|  | Compound obtained in Syn. Ex. 2 |  | 100 |  |  |  |  |  |  |
|  | Compound obtained in Syn. Ex. 3 |  |  | 100 |  |  |  |  |  |
|  | Compound obtained in Syn. Ex. 4 |  |  |  | 100 |  |  |  |  |
|  | Compound obtained in Syn. Ex. 5 |  |  |  |  | 100 |  |  |  |
|  | Compound obtained in Syn. Ex. 6 |  |  |  |  |  | 100 |  |  |

TABLE 2-continued

|  |  | EX 1 | EX 2 | EX 3 | EX 4 | EX 5 | EX 6 | CE 1 | CE 2 |
|---|---|---|---|---|---|---|---|---|---|
|  | Epoxysilane compound |  |  |  |  |  |  | 100 |  |
|  | Curing catalyst | 10 | 10 | 10 | 10 | 10 | 10 | 10 |  |
|  | Epotek 353ND, liquid A |  |  |  |  |  |  |  | 100 |
| Liquid B | Water | 5 | 5 | 5 | 5 | 5 | 5 | 5 |  |
|  | Epotek 353ND, liquid B |  |  |  |  |  |  |  | 10 |
| Evaluations | Tack-free time (min) | 60 | 25 | 15 | 10 | 30 | 15 | 47 | not measurable |
|  | Shear strength |  |  |  |  |  |  |  |  |
|  | Initial (kgf/cm$^2$) | 95 | 149 | 166 | 155 | 128 | 132 | 60 | 67 |
|  | After moist heat deterioration (kgf/cm$^2$) | 60 | 129 | 124 | 134 | 112 | 125 | 15 | 9 |

The ingredients in Table 2 were as follows.
Epoxy Silane Compound (3-glycidoxypropyltrimethoxysilane): A-187, produced by Nippon Unicar Co., Ltd.
Curing catalyst (dibutyltin diacetylacetonate): U-220, produced by Nitto Kasei Co., Ltd.

As is apparent from Table 2 above, the compositions in Examples 1 to 6 which included at least one of the compounds obtained in Synthesis Examples 1 to 6 cured in 10 to 60 minutes even at room temperature and had excellent adhesive properties compared with the composition in Comparative Example 1, which did not include a compound obtained in Synthesis Examples 1 to 6, and the prior-art epoxy adhesive in Comparative Example 2. In particular, the marked difference in shear strength following moist heat deterioration demonstrated that the compositions in Examples 1 to 6 had outstanding resistances to moist heat.

<Preparation of One-Part Adhesive Compositions>

Examples 7 to 11, and Comparative Example 3

The ingredients shown in Table 3 were mixed in the indicated proportions (parts by weight) and thoroughly dispersed using a stirrer, thereby giving the respective compositions shown in Table 3.

Using the resulting compositions obtained in the respective examples, the cure rate (moisture curability) was evaluated in the same way as described above. The adhesive properties and the resistance to moist heat were evaluated by the methods described below. The results are shown in Table 3.

(Evaluation of Adhesive Properties and Resistance to Moist Heat)

Aside from changing the curing conditions to 20° C. and 65% RH for 3 days, test specimens were prepared in the same way as described above, and the shear strength (initial) was measured.

Test specimens were also subjected to deterioration by being held in a 80° C., 95% RH atmosphere for 10 days. The resulting specimens were then used to measure the shear strength (after moist heat deterioration) in the same way as described above.

TABLE 3

|  | EX 7 | EX 8 | EX 9 | EX 10 | EX 11 | CE 3 |
|---|---|---|---|---|---|---|
| Compound obtained in Synthesis Example 2 | 100 |  |  |  |  |  |
| Compound obtained in Synthesis Example 3 |  | 100 |  |  |  |  |
| Compound obtained in Synthesis Example 4 |  |  | 100 |  |  |  |
| Compound obtained in Synthesis Example 5 |  |  |  | 100 |  |  |
| Compound obtained in Synthesis Example 6 |  |  |  |  | 100 |  |
| Epoxysilane compound |  |  |  |  |  | 100 |
| Curing catalyst | 10 | 10 | 10 | 10 | 10 | 10 |
| Tack-free time (min) | 90 | 60 | 45 | 120 | 60 | 180 |
| Shear strength |  |  |  |  |  |  |
| Initial (kgf/cm$^2$) | 110 | 152 | 160 | 100 | 110 | 45 |
| After moist heat deterioration (kgf/cm$^2$) | 121 | 128 | 124 | 118 | 124 | 9 |

The respective ingredients in Table 3 were the same as those in Table 2.

As is apparent from Table 3, the one-part adhesive compositions in Examples 7 to 11 which contain the compounds prepared in Synthesis Examples 2 to 6, like the two-part adhesive composition obtained in Examples 1 to 6 shown in Table 2, had excellent adhesive properties and an excellent resistance to moist heat. In particular, the shear strength (initial) when moisture-cured at room temperature tended to be slightly lower than the shear strength (initial) when heat cured (see Table 2), but was much better than that the shear strengths of the prior-art two-part epoxy adhesive (Comparative Example 2) and the epoxy silane cured composition (Comparative Example 3). That is, the one-part adhesive compositions of Examples 7 to 11 were demonstrated to be fully satisfactory, even when used as moisture-curable adhesive compositions.

<Bonding of Optical Fiber with Ferrule>

Figure 1:
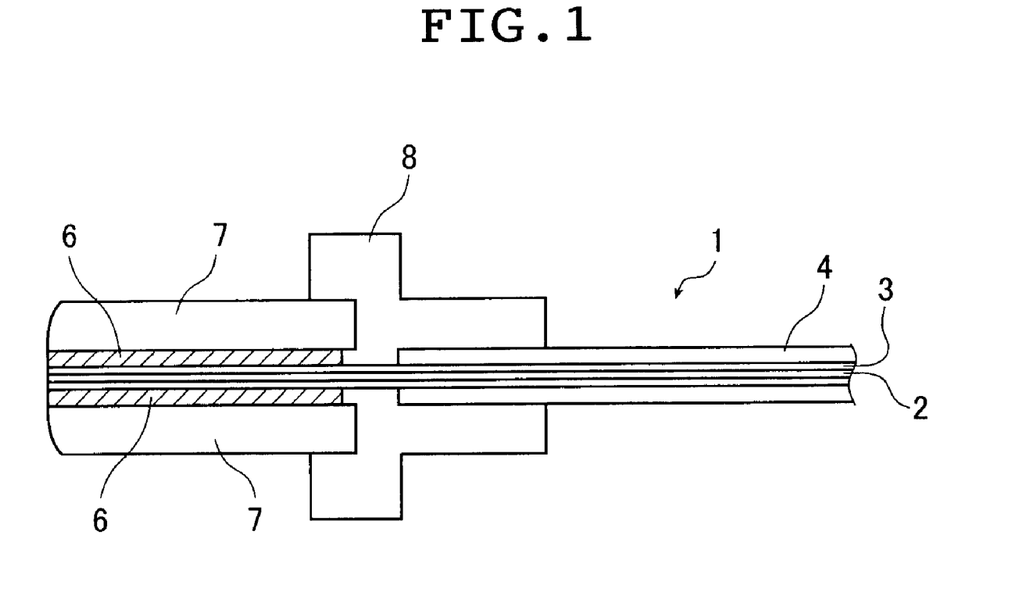
FIG. 1 is a schematic longitudinal sectional view showing an example of the connection portion of an optical connector where an optical fiber and a ferrule have been bonded using a composition of the invention.

FIG. 1 is a schematic longitudinal sectional view showing an example of the connection portion of an optical connector where an optical fiber and a ferrule have been bonded using a composition of the invention.

As shown in FIG. 1, a 2 cm long portion from which the polymer coating 4 had been removed at one end of a single-mode glass optical fiber (length, about 1 m) having a polymer coating 4, a core 2 and a cladding 3 was coated with the composition of Example 2 or the composition of Comparative Example 2, inserted into the hollow portion of a zirconia ferrule 7 attached to a flange 8, then heated at 110° C. and held stationary for one hour, thereby bonding the optical fiber 1 to the ferrule 7 with the adhesive layer 6. The end face of the ferrule was then precisely polished.

Next, an assembly obtained by bonding this optical fiber 1 and the ferrule 7 (initial specimen) and an identical assembly that was held for 10 days in a 80° C., 95% RH atmosphere (moist heat-deteriorated specimen) were each gripped by the ferrule 7 and the optical fiber 1 and lightly pulled. Of the assemblies obtained by bonding with the composition of Comparative Example 2, which is a prior-art epoxy adhesive, the initial assembly did not experience failure of the bond, but the moist heat deteriorated assembly underwent separation at the interface between the adhesive 6 and the optical fiber 1. By contrast, neither of the assemblies bonded using the composition of Example 2 experienced adhesive failure. This is presumably because the composition of the Example 2 had excellent adhesive properties and an excellent resistance to moist heat.

<Synthesis of Reactive Silicon-Containing Group-Bearing Compound (B)>

Synthesis Examples 7 to 10

The ingredients shown in Table 4 below were mixed in the indicated proportions (parts by weight) and stirred under an inert gas atmosphere at 80° C. for 8 hours, thereby giving in the respective examples a compound corresponding to the above-described reactive silicon-containing group-bearing compound (B) (the above compound (f)).

The silylation ratio shown in Table 4 for each synthesis example is the stoichiometric ratio of the number of molecules of the iminosilane compound or epoxysilane compound reacted to the number of epoxy groups on the aromatic epoxy compound or the number of active hydrogens on the aromatic amine compound, expressed as a percentage. For example, in Synthesis Example 7, one molecule of an iminosilane compound is reacted with an aromatic epoxy compound having two epoxy groups, so the silylation ratio is 50%. In Synthesis Example 10, four molecules of an epoxysilane compound are reacted with an aromatic amine compound having two amino groups (which have four active hydrogens), so the silylation ratio is 100%.

The resulting compounds are presumed to be, in Synthesis Example 7, the compound of the above formula (3); in Synthesis Example 8, a mixture of the compounds of the above formulas (3) and (4); in Synthesis Example 9, the compound of above formula (4); and in Synthesis Example 10, the compound of the above formula (7).

TABLE 4

|  | Synthesis Example 7 | Synthesis Example 8 | Synthesis Example 9 | Synthesis Example 10 |
| --- | --- | --- | --- | --- |
| Aromatic epoxy compound | 100 | 100 | 100 |  |
| Aromatic amine compound |  |  |  | 100 |
| Iminosilane compound | 64 | 96 | 128 |  |
| Epoxysilane compound |  |  |  | 477 |
| Silylation ratio | 50% | 75% | 100% | 100% |

The ingredients in Table 4 were as follows.

Aromatic epoxy compound (bisphenol A glycidyl ether): Epotote YD-128, produced by Toto Kasei KK.

Aromatic amine compound (methylene dianiline): MDA, produced by Kanto Chemical Co., Ltd.

Iminosilane compound (the compound of the formula (1) above): Alink-15, produced by Nippon Unicar Co., Ltd.

Epoxysilane compound (3-glycidoxypropyltrimethoxysilane): A-187, produced by Nippon Unicar Co., Ltd.

<Preparation and Evaluation of Two-Part Adhesive Composition>

Examples 12 to 15, and Comparative Examples 4 and 5

Liquid A ingredients shown in Table 5 below were mixed in the indicated proportions (parts by weight) and thoroughly dispersed using a stirrer, following which the entire amount of Liquid B ingredient was added and thoroughly dispersed therein, giving the respective compositions shown in Table 5. In Comparative Example 5, a prior-art epoxy-type adhesive composition (produced by Muromachi Technos Co., Ltd. under the trade name Epotek 353ND) was used.

Each of the resulting compositions was evaluated as described below for cure rate (moisture curability), adhesive properties, and resistance to moist heat.

The results are shown in Table 5. The composition in Comparative Example 5 was heat-curable, and thus did not cure at room temperature

TABLE 5

|  |  | EX 12 | EX 13 | EX 14 | EX 15 | CE 4 | CE 5 |
| --- | --- | --- | --- | --- | --- | --- | --- |
| Liquid A | Compound obtained in Syn. Ex. 7 |  |  | 100 |  |  |  |
|  | Compound obtained in Syn. Ex. 8 | 100 |  |  |  |  |  |
|  | Compound obtained in Syn. Ex. 9 |  | 100 |  | 100 |  |  |
|  | Compound obtained in Syn. Ex. 10 |  |  |  | 50 |  |  |
|  | Methylsilyl ester | 100 | 100 | 100 | 100 | 100 |  |
|  | Epoxysilane compound |  | 20 | 20 | 20 |  |  |
|  | Curing catalyst | 10 | 10 | 10 | 10 | 10 |  |
|  | Epotek 353ND, liquid A |  |  |  |  |  | 100 |
| Liquid B | Water | 5 | 5 | 5 | 5 | 5 |  |
|  | Epotek 353ND, liquid B |  |  |  |  |  | 10 |
| Evaluations | Tack-free time (min) | 18 | 12 | 22 | 9 | 5 | — |
|  | Shear strength |  |  |  |  |  |  |
|  | Initial (kgf/cm$^2$) | 164 | 154 | 146 | 138 | 60 | 67 |
|  | After moist heat deterioration (kgf/cm$^2$) | 196 | 168 | 136 | 134 | 15 | 9 |

The respective ingredients in Table 5 were as follows. The epoxysilane compound used here was the same as that shown in Table 4.

Methylsilyl ester: MSE-100, produced by Wacker Asahikasei Silicone Co., Ltd.

Curing catalyst (dibutyltin diacetylacetonate): U-220, produced by Nitto Kasei Co., Ltd.

As is apparent in Table 5, the compositions in Examples 12 to 15 which include at least one of the compounds obtained in Synthesis Examples 7 to 10 cured in several minutes at room temperature and exhibited excellent adhesive properties compared with the composition in Comparative Example 4, which did not include the compounds obtained in Synthesis Examples 7 to 10, and the prior-art epoxy adhesive (Comparative Example 5). In particular, the marked difference in shear strength following moist heat deterioration demonstrated that the compositions in Examples 12 to 15 had outstanding resistances to moist heat.

<Preparation of One-Part Adhesive Compositions>

Examples 16 to 19, and Comparative Example 6

The ingredients shown in Table 6 below were mixed in the indicated proportions (parts by weight) and thoroughly dispersed using a stirrer, thereby giving the respective compositions shown in Table 6.

Using the resulting compositions obtained in the respective examples, the cure rate (moisture curability), the adhesive properties and the resistance to moist heat were evaluated in the same way as described above. The results are shown in Table 6.

TABLE 6

|  | EX 16 | EX 17 | EX 18 | EX 19 | CE 6 |
|---|---|---|---|---|---|
| Compound obtained in Synthesis Example 7 |  |  | 100 |  |  |
| Compound obtained in Synthesis Example 8 | 100 |  |  |  |  |
| Compound obtained in Synthesis Example 9 |  | 100 |  | 100 |  |
| Compound obtained in Synthesis Example 10 |  |  |  | 50 |  |
| Methylsilyl ester | 100 | 100 | 100 | 100 | 100 |
| Epoxysilane compound |  | 20 | 20 | 20 |  |
| Curing catalyst | 10 | 10 | 10 | 10 | 10 |
| Tack-free time (min) | 70 | 45 | 90 | 35 | 20 |
| Shear strength |  |  |  |  |  |
| Initial (kgf/cm$^2$) | 145 | 142 | 112 | 131 | 56 |
| After moist heat deterioration (kgf/cm$^2$) | 190 | 161 | 140 | 135 | 13 |

The respective ingredients in Table 6 were the same as those in Table 5.

As is apparent from Table 6, the one-part adhesive compositions in Examples 16 to 19 which contain the compounds prepared in Synthesis Examples 7 to 10, like the two-part adhesive composition obtained in Examples 12 to 15 shown in Table 5, had excellent adhesive properties and an excellent resistance to moist heat. In particular, the shear strength (initial) when moisture-cured at room temperature tended to be slightly lower than the shear strength (initial) when heat cured (see Table 5), but was much better than the shear strengths of the prior-art two-part epoxy adhesive (Comparative Example 5) and the epoxy silane cured composition (Comparative Example 6). That is, the one-part adhesive compositions of Examples 16 to 19 were demonstrated to be fully satisfactory, even when used as moisture-curable adhesive compositions.

<Bonding of Optical Fiber with Ferrule>

FIG. 1 is a schematic longitudinal sectional view showing an example of the connection portion of an optical connector where an optical fiber and a ferrule have been bonded using a composition of the invention.

As shown in FIG. 1, a 2 cm long portion from which the polymer coating 4 had been removed at one end of a single-mode glass optical fiber (length, about 1 m) having a polymer coating 4, a core 2 and a cladding 3 was coated with the composition of Example 12 or the composition of Comparative Example 5, inserted into the hollow portion of a zirconia ferrule 7 attached to a flange 8, then heated at 110° C. and held stationary for one hour, thereby bonding the optical fiber 1 to the ferrule 7 with the adhesive layer 6. The end face of the ferrule was then precisely polished.

Next, an assembly obtained by bonding this optical fiber 1 and the ferrule 7 (initial specimen) and an identical assembly that was held for 10 days in a 80° C., 95% RH atmosphere (moist heat-deteriorated specimen) were each gripped by the ferrule 7 and the optical fiber 1 and lightly pulled. Of the assemblies obtained by bonding with the composition of Comparative Example 5, which is a prior-art epoxy adhesive, the initial assembly did not experience failure of the bond, but the moist heat deteriorated assembly underwent separation at the interface between the adhesive 6 and the optical fiber 1. By contrast, neither of the assemblies bonded using the composition of Example 12 experienced adhesive failure. This is presumably because the composition of Example 12 had excellent adhesive properties and an excellent resistance to moist heat.

The invention claimed is:

1. An adhesive composition for optical fibers; comprising:

a compound (B) having at least one reactive silicon-containing group, which is obtained by reacting an aromatic epoxy compound with a secondary aminosilane compound; and an alkylsilyl ester, wherein said alkylsilyl ester is represented by the formula:

and/or oligomer thereof, wherein R$^1$ is an alkyl group having 1 to 6 carbon atoms and R$^2$ is an alkyl group having 1 to 3 carbon atoms.

2. The adhesive composition for optical fibers of claim 1, wherein the alkylsilyl ester is a methylsilyl ester monomer and/or oligomer.

3. The adhesive composition for optical fibers claim 1 which comprises from 1 to 300 parts by weight of the reactive silicon-containing group-bearing compound (B) per 100 parts by weight of the alkylsilyl ester.

4. The adhesive composition for optical fibers claim 1 which further comprises a curing catalyst.

5. The adhesive composition for optical fibers of claim 1, wherein the aromatic epoxy compound is a glycidyl ether of bisphenol A or a glycidyl ether of bisphenol F.

6. The adhesive composition for optical fibers of claim 1, wherein said secondary aminosilane is represented by the following formula (1)

(1)

7. The adhesive composition for optical fibers of claim 1, wherein the compound (B) is a reaction product obtainable by reacting one to two equivalents of the compound represented by the following formula (1)

(1)

with one equivalent of the glycidyl ether of bisphenol A or glycidyl ether of bisphenol F.

8. An adhesive composition for optical fibers, comprising:
a compound represented by the following formula (7)

(7)

and
an alkylsilyl ester, wherein said alkylsilyl ester is represented by the formula:

and/or oligomer thereof. wherein $R^1$ is an alkyl group having 1 to 6 carbon atoms and $R^2$ is an alkyl group having 1 to 3 carbon atoms.

\* \* \* \* \*